Patented Nov. 7, 1944

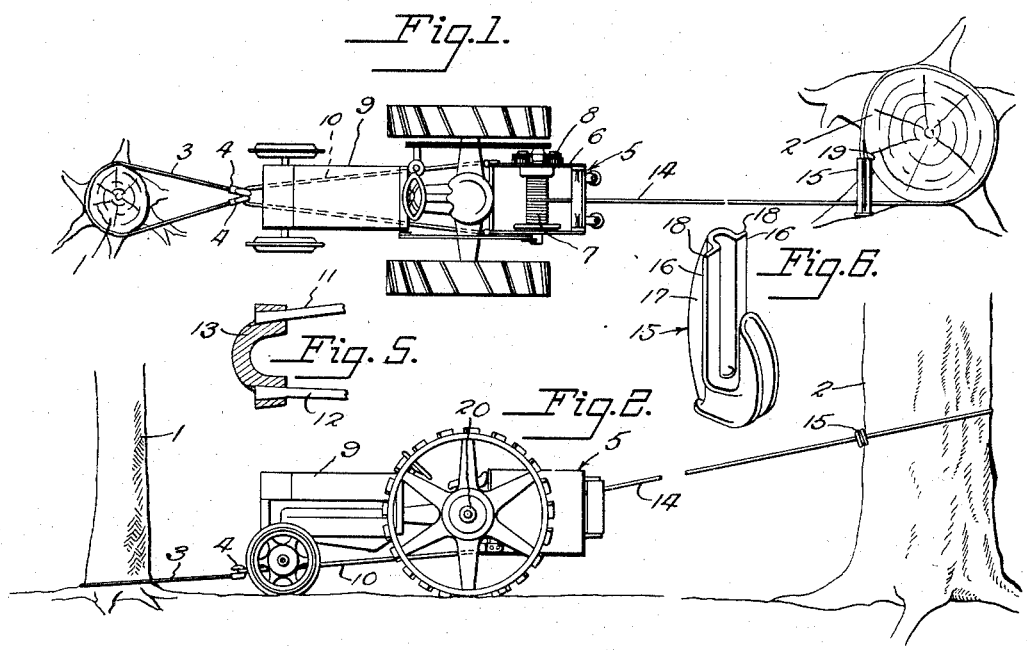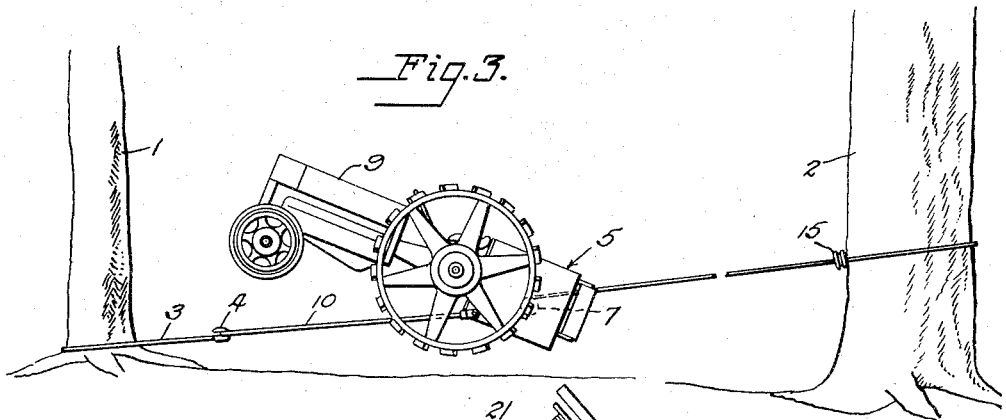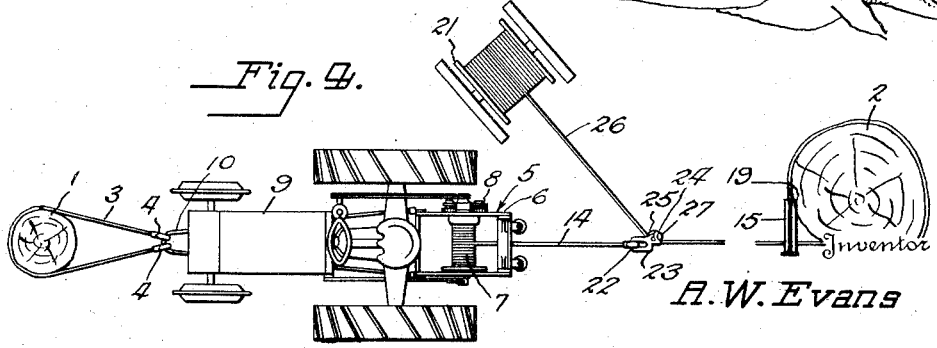

2,361,931

UNITED STATES PATENT OFFICE 2,361,931

METHOD OF CLEARING LAND OF TREES

Alfred W. Evans, Gloucester, Va.

Application December 30, 1942, Serial No. 470,619

2 Claims. (Cl. 37—2)

This invention relates to a method and means for clearing land of trees. It relates to trees of any size, but particularly large trees, the removal of which according to known methods is to cut the log and then to dig up or blast out the stump. Digging the stump is slow and expensive, and the earth removed must be shoveled or scooped back to fill the hole. When the stump is blasted the earth is irrecoverably scattered and earth from elsewhere must be hauled to fill the hole. In either case the log and the stump or fragments thereof must be separately removed from the area being cleaned.

By the subject method and means the entire tree, including the stump, is toppled without recourse to digging or blasting, and while the stump is over the hole the adherent earth is made to fall into the hole which it completely fills, for reasons presently explained. Then the entire tree, including the trunk and stump, may be dragged as a unit from the scene.

One of the objects of the invention is to provide a method and means for pulling a tree, which involves extending a cable between an anchor tree and the tree to be pulled, tangentially at one side only of the latter tree, and about the anchor tree in such manner as to pull equally from both sides, and applying a power unit as a link in said cable whereby the cable is tensioned to the point at which the victim tree yields, the latter tree being given an initial twist while the anchor tree is not subjected to twist.

Another object of the invention is the application of the twisting strain to the tree to be pulled in a series of pulls, with short rest periods in between, the reaction of the roots to the pulling stress assisting in breaking them from the ground.

A further object of the invention is the arrangement of the cable between the anchor tree and tree to be pulled, and the intercalation of the power unit in the line of force transmission between the trees, in such manner that all parts of the cable are tensioned to the extent sufficient to uproot the tree without there being produced any angular deflection in the cable which would cause localized strain concentrations tending to break the cable.

Still another object of the invention is to provide a power link in the cable line between the trees, including a drum on which the cable is wound to apply the necessary pulling force, with means for keeping surplus cable off the drum, so that the lever arm represented by the radius of the drum can be kept as short as possible, to secure maximum power application to the cable.

Other objects of the invention will appear as the following description of a preferred and practical embodiment thereof proceeds.

In the drawing which accompanies and forms a part of the following specification, and throughout the several figures of which the same characters of reference have been employed to designate identical parts:

Figure 1 is a plan view of a cable and power unit arrangement between an anchor tree and victim tree, illustrating the principles of the invention;

Figure 2 is a side elevation showing the arrangement of parts, prior to the application of maximum tension to the cable;

Figure 3 is a view similar to Figure 2, illustrating the relative positions of parts when maximum power is applied;

Figure 4 is a plan view showing a slightly modified form of the invention;

Figure 5 is a plan view, partly in section, illustrating the rigid yoke which may be employed at the bight of the cable loop attached to the winch;

Figure 6 is a perspective view of a hook of the type which is employed to secure the cable hitch about the victim tree.

Referring now in detail to the several figures, the numerals 1 and 2 represent, respectively, an anchor tree and the tree to be pulled, the distances between which trees may, of course, vary. A length of cable 3 is provided, having rigid hooks 4 at its opposite ends. This length of cable is placed around the anchor tree to form a loop with the hooks 4 in juxtaposition. A winch 5 is provided, comprising a frame 6 in the side walls of which a drum 7 is journaled. The drum is operated by suitable reduction gearing 8 through a connection to the power plant of the tractor 9 which transports the winch. The tractor has no essential part in the invention, excepting as a carrier of and a supplier of power for the winch. A cable loop 10 is secured at its ends in a substantial manner to the frame 6 of the winch 5. Said cable loop is engaged by the hooks 4 on the length of the cable 3. Preferably, to avoid the localized concentration of strain at the bight of the loop, the cable loop 10 is formed of independent cable sections 11 and 12 connected to a rigid yoke member 13 which itself forms the bight of the loop.

The end of a cable 14 is fixed to the drum and the cable is normally wound upon the drum. When the cable loop 10 is engaged with the length of cable 3, the winch 5 is relatively close to the anchor tree. The cable 14 is then paid off from the drum 7 until it is sufficiently extended to be passed around the victim tree. The far end of the cable 14 is provided with a hook 15, such as that shown in Figure 6, which after the cable 14 has been passed around the tree, is hooked over or under the cable 14 to form a hitch, as illustrated in Figure 1. One of the essentials of the invention is that the tree to be pulled must be initially twisted and that the great force required to do this shall be transmitted without causing material deflection in the cable 14 at the point engaged by the hook 15. Provision is made to prevent slippage of the cable 14 about the tree 2 after the hook 15 has assumed a position perpendicular to the cable 14, as shown in Figure 1. This means comprises a flange 16 formed longitudinally on the shank 17 of the hook, having a biting corner 18 which digs into the bark or outer wood of the tree. A hook is therefore selected, having a shank of such length as to be suitable for the size of the tree to be pulled. Two or three lengths of shank are sufficient to care for trees of all sizes. In Figure 1, the shank 17 digs into the tree at the point 19, preventing further slippage of the hitch of the cable 14 about the tree, the length of the shank 17 being such as to hold the hook in alignment with the straight portion of the cable 14 extending from the winch tangential to the tree.

The winch 5, itself, obviously forms a link in the lines of force transmission between the anchor tree 1 and the victim tree 2. When sufficient tension has been applied to the cable connection between the two trees by winding the cable 14 on the drum 7, the winch tilts upwardly to bring the points of attachment of the cable loop 10 with the winch into alignment with the plane of the cable loop 10 and the cable 14. Since the tractor 10 is fixed with respect to the winch, the front of the tractor will tilt up into the air about the axle 20 of the tractor. The cable hitch about the tree 2 is placed as high as possible above the ground to provide the maximum tilting leverage. When the cable connection tightens under stress, this may cause the entire tractor to be lifted from the ground. In placing the tractor and winch, it is not essential that these be brought into accurate alignment between the anchor tree 1 and the tree 2, for as the tension in the cable connection between the two trees increases, the tractor will be dragged laterally across the ground to bring the several members through which the force is transmitted, into perfect alignment.

It is obvious from Figure 1 that both legs of the length of cable 3 will be rectilinear from their points of tangency with the anchor tree to their points of attachment to the cable loop 10, and that the sections 11 and 12 of the latter, especially where the rigid yoke 13 is employed, are also in straight alignment, that the cable 14 from the drum to its point of tangency with the tree 2 is also rectilinear throughout its extent. Thus, regardless of the tensioning pull of the cable, no kinks or angular deflections are produced which would create concentrations of strain in the cable, tending to break it at these points of angular deflection.

The principle of operation of the subject tree clearing method and means is that perhaps four-fifths of the resistance of a tree to breaking its grip with the ground is overcome by initially twisting the tree, and that after it has been twisted to a very slight extent, only small additional force is required to topple it.

It is assumed that a tree has trunk roots radiating from the lower part of the stump in various directions, that each of these trunk roots has smaller roots diverging therefrom, and that these in turn have thousands of smaller roots and rootlets in intimate frictional association with the ground. It has been found that if the frictional grip of these smaller roots is overcome, not a great deal of additional power is required to overthrow the tree. It has also been found that the twisting torque should be applied to the tree in a series of pulls with a brief pause in between, the tension being held during the pause. The reason for this is explained as follows. The roots of a living tree possess elasticity so that when they are bent in a spiral direction by the twisting of the tree, away from their repose position, they tend to straighten out if given the opportunity to do so. The initial bending results in the pulling of the small roots and rootlets slightly away from the matrix of earth in which they are imbedded. After the initial twist, as a result of which the circumferential displacement of the tree is almost imperceptible, the tree is held for a moment or two in this position, during which interval the roots, due to their elasticity, tend to straighten out, thus drawing the rootlets still further through the ground. Then the tree is given another twistwise pull, resulting in circumferential displacement of greater magnitude, the amount of displacement again held and the roots permitted to recover their original length once again. By the time several such successive pulls have been imparted twistwise to the tree, all of the small roots and rootlets have let go their adhesion to the earth and the major grip of the tree with the ground has been broken. It will be understood that after the initial pull or pulls, the tree begins to topple as well as twist, so that the bending of the roots may be in vertical as well as horizontal planes, or in any direction therebetween.

The resistance of the tree to twisting progressively decreases quite rapidly following the initial breaking away of the small roots and rootlets from the matrix soil, so that while it is inevitable that the point at which the hitch hook 15 engages, the cable 14 moves inward toward the tree, causing a slight angular deflection of the cable 14 at said point. This is compensated by the fact that the resistance of the tree decreases to such an extent that no dangerous concentrating strain is produced at the point of deflection.

It will be understood that inasmuch as the hitch of the cable 14 about the tree 2 is some distance from the ground, the force applied to the tree by the pull of the winch is resolved into two components, one acting to twist the tree, and the other to pull it over. At first, only the twisting component is effective in moving the tree, but when the tree begins to move and the twisting component thereafter progressively lessens, the toppling component correspondingly progressively increases so that the tree is finally pulled over onto the ground.

It will be observed that the length of cable 3 is placed about the anchor tree 1 in such a manner as to distribute the pull equally on both sides so that there is no twisting moment imparted to the anchor tree. Furthermore, the hitch of the length of cable 3 about the anchor tree is placed as close as possible to the ground so that there is no force component tending to topple the tree.

Consequently, although both trees are subjected to the same tension, the uprooting action affects only the victim tree. Therefore, a relatively small tree may be employed as an anchor to uproot a much larger tree.

It is generally desirable to interpose the winch in the line of force transmission as close as possible to the anchor tree, to prevent the tractor being lifted too far from the ground when the cable straightens out under tension. The tree to be pulled is frequently at a relatively great distance from the winch so that a considerable length of cable is necessary to reach the tree to be pulled. If surplus cable were wound upon the drum 7, the diameter of the wound drum would be increased to such an extent as to impair the power capacity of the winch unit. Consequently, it is frequently desirable to keep the surplus cable off of the drum 7. Figure 4 shows a modification of the invention, in which only a short amount of cable is carried by the drum 7, merely enough to be taken in to twist and topple the tree. Surplus cable sufficient to reach a distant tree is carried upon an auxiliary wheeled drum 21. The free end of the cable 14 which is secured to the drum is provided with a hook 22 adapted to carry a snubbing device 23. This device has a take-up 24 which allows the passage of a cable 26 from the auxiliary drum 21, which cable is drawn through the take-up to the requisite extent to reach the victim tree, and to permit a hitch to be thrown about the same. The far end of the cable 26 is provided with the hitch hook 15. The take-up 24 is provided with a pivoted eccentric cam 27 which can be turned so as to immovably cramp the cable 26 in the take-up. The part of the cable 26 which reaches from the take-up to the tree to be pulled, that is, the part of the cable 26 which is under tension, is rectilinear when tensioned, and free from any angular deflection.

When the tree has been toppled, the roots with the adherent earth overlie the hole from which they were extracted. To fill the hole, it is necessary merely to run a tractor with a bumper against the roots to jar the earth off into the hole. This can also be accomplished with a backhoe attached to a tractor, or by hand with a mattock or pick. The earth will completely fill the hole and in its loose condition it will round up over the hole. This seems rather paradoxical inasmuch as the roots originally occupied some space in the hole, but it should be borne in mind that the acorn from which the tree originated, occupied practically no space, and as the roots grew, no earth was removed. As the roots grew they merely compressed the earth, so that in the adult tree all the original earth is still there, but in compressed form. Therefore, all the original earth is present, but in loosened state when it is jarred from the roots back into the hole. As the roots of the tree overlie the hole, the earth will fall back into the hole in the same manner in which it was originally placed; the sub-soil on the bottom and the top soil on top. In order to provide a level surface it is necessary merely to run a roller over the mound of earth which overtops the root hole.

After the tree has been toppled and the earth shaken from the roots, the tractor is disconnected from the length of cable 3 which surrounds the anchor tree and moves off, dragging the entire tree, trunk, roots and all. With large trees the roots may be cut from the trunk before the log is dragged away. It is generally desirable to remove the slashes and burn them and the roots in the cleared area. There are times, however, such as when the clearing is being done close to a battle area, when it is dangerous to start fires. In such cases the entire tree will be dragged off.

By the use of the method and means above disclosed, and the employment of several sets of the apparatus, it is possible within a period of ten hours, to clear and level an adequate airplane landing strip five thousand two hundred eighty feet long and one hundred sixty feet wide in heavily timbered jungle land.

While I have in the above disclosure described what I believe to be a preferred and practical embodiment of the invention, it will be understood by those skilled in the art that the specific details of construction and arrangement of parts are by way of illustration and not to be construed as limiting the scope of the invention which is defined in the appended claims.

What I claim as my invention is:

1. The method of pulling a tree comprising, arranging a cable system to provide a connection about an anchor tree in such manner that the pull of the cable system, when tensioned, is equally distributed on both sides of the anchor tree, and a connection about the tree to be pulled in such manner that the pull of the cable system, when tensioned, is tangential at one side only of the tree to be pulled, with means applied to the connection to prevent circumferential slippage of the connection about the tree to be pulled, and intercalating a winch freely in the line of force transmission through said cable system between said trees, whereby the points of attachment of said winch with the respective portions of the cable system between which said winch is interposed assume alignment with said cable system when tensioned.

2. The method of pulling a tree comprising, arranging a cable system to provide a connection about an anchor tree in such manner that the pull of the cable system, when tensioned, is equally distributed on both sides of the anchor tree, and a connection about the tree to be pulled in such manner that the pull of the cable system, when tensioned, is tangential at one side only of the tree to be pulled, with means applied to the connection to prevent circumferential slippage of the connection about the tree to be pulled, and intercalating a winch freely in the line of force transmission through said cable system between said trees, whereby the points of attachment of said winch with the respective portions of the cable system between which said winch is interposed assume alignment with said cable system when tensioned, and increasing the tension of the cable system by a series of successive step-by-step increments to apply a series of pulls twistingly to the tree to be pulled, with a short pause between each pull.

ALFRED W. EVANS.